United States Patent
Wisniewski

(10) Patent No.: US 12,522,360 B2
(45) Date of Patent: Jan. 13, 2026

(54) PASSENGER SUITE ACCESS FEATURE

(71) Applicant: Elevate Aircraft Seating LLC, Bothell, WA (US)

(72) Inventor: Max Zenon Wisniewski, Seattle, WA (US)

(73) Assignee: Elevate Aircraft Seating LLC, Bothell, WA (US)

( * ) Notice: Subject to any disclaimer, the term of this patent is extended or adjusted under 35 U.S.C. 154(b) by 0 days.

(21) Appl. No.: 18/620,040

(22) Filed: Mar. 28, 2024

(65) Prior Publication Data
US 2025/0304258 A1   Oct. 2, 2025

(51) Int. Cl.
B64D 11/06 (2006.01)

(52) U.S. Cl.
CPC ...... B64D 11/0606 (2014.12); B64D 11/0602 (2014.12)

(58) Field of Classification Search
CPC .............. B64C 1/1438; B64D 11/0606; B64D 11/0602; E05D 15/58
See application file for complete search history.

(56) References Cited

U.S. PATENT DOCUMENTS

| | | | |
|---|---|---|---|
| 7,611,190 B1 * | 11/2009 | Elliott | B60J 5/06 49/248 |
| 7,658,438 B1 * | 2/2010 | Elliott | E05D 15/1081 296/155 |
| 7,798,557 B2 * | 9/2010 | Elliott | B60J 5/06 296/146.12 |
| 10,443,282 B2 * | 10/2019 | Bauer | E05D 15/1047 |
| 11,084,587 B2 * | 8/2021 | Robinson | B64C 1/1423 |
| 2020/0347656 A1 * | 11/2020 | Groninga | B64C 1/1438 |
| 2022/0402612 A1 * | 12/2022 | Davis | B64D 11/0023 |
| 2023/0365261 A1 * | 11/2023 | Yates | E05B 1/0046 |

* cited by examiner

Primary Examiner — Christopher D Hutchens
(74) Attorney, Agent, or Firm — Yee & Associates, P.C.

(57) ABSTRACT

A passenger suite for an aircraft. The passenger suite includes a partition and a door. The partition includes a fixed panel and a movable panel. The movable panel is pivotally connected to the fixed panel. The door is slidably connected to the fixed panel. The door and the partition separate the passenger suite from a passenger cabin aisle of the aircraft. The door is movable between a closed position, a first open position, and a second open position relative to the partition. The passenger suite provides improved access for passengers with restricted mobility while also serving as a functional emergency passage feature.

20 Claims, 8 Drawing Sheets

PASSENGER SUITE ACCESS FEATURE

BACKGROUND INFORMATION

1. Field

The present disclosure relates generally to accessing a passenger suite of an aircraft. More specifically, the present disclosure relates to a passenger suite access feature that provides improved access to a business class suite of a commercial aircraft for passengers with restricted mobility.

2. Background

Current layout of passenger designs adopt a standard opening size to accommodate passenger ingress and egress of a typical passenger suite of a commercial aircraft. For example, the opening may provide an approximate industry standard of twenty inches of clearance between the door opening of the passenger's suite to the back of the passenger suite positioned forward of the passenger's suite. The standard opening size may present ingress and egress challenges for passengers with restricted mobility. Restricted mobility passengers may have difficulty moving their bodies through the opening or the size of the opening may prevent the use of required mobility aids such as wheelchairs, walkers, and canes while entering and exiting the suite.

Further, the government regulatory body that establishes national standards for qualifications of passenger design layouts and ensures consistent compliance with them also requires that suites that include doors must include an emergency passage feature. The emergency passage feature is the means to escape the passenger suite in the event of failure of the suite door's primary opening mechanism. The emergency passage feature must be accessible from either side of the doorway/opening of the passenger suite. In other words, the emergency passage feature must be operable from either inside the passenger suite or from the passenger cabin aisle of the aircraft.

Therefore, it would be desirable to have a method and apparatus that takes into account at least some of the issues discussed above, as well as other possible issues.

SUMMARY

An illustrative embodiment of the present disclosure provides a door assembly. The door assembly includes a door, a partition, and a translation device. The door is connected to the partition and the door is movable between a closed position, a first open position, and a second open position. The translation device is connected to the door and the partition. The door is slidable relative to the partition between the closed position and the first open position via the translation device. The door is pivotable relative to the partition between the first open position and the second open position via the translation device.

Another illustrative embodiment of the present disclosure provides a passenger suite for an aircraft. The passenger suite includes a partition and a door. The partition includes a fixed panel and a movable panel. The movable panel is pivotally connected to the fixed panel. The door is slidably connected to the fixed panel. The door and the partition separate the passenger suite from a passenger cabin aisle of the aircraft. The door is movable between a closed position, a first open position, and a second open position relative to the partition.

A further illustrative embodiment of the present disclosure provides a method for opening a door of a passenger suite. The passenger suite is separated from an aisle with the door and a partition. The partition includes a movable panel and a fixed panel. The door is connected to the movable panel. The door is slid relative to the movable panel and the fixed panel from a closed position to a first open position such that a plane of the door and a plane of the partition remain parallel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that standard layouts of passenger designs typically include a standard opening size for passenger ingress and egress of a passenger suite of a commercial aircraft.

The illustrative embodiments also recognize and take into account that the standard passenger suite opening size may present ingress and egress challenges for passengers with restricted mobility.

The illustrative embodiments also recognize and take into account that the national standard for passenger design layouts of passenger suites also requires that passenger suites that include doors must include an emergency passage feature.

The illustrative embodiments also recognize and take into account that the emergency passage feature must be operable from inside the passenger suite and from the passenger cabin aisle of the aircraft.

Thus, the illustrative embodiments provide a design integrated in the suite door area of a business class suite that enables improved access for passengers with restricted mobility while also serving as a functional emergency passage feature required by regulators for suites that include doors.

Figure 1:
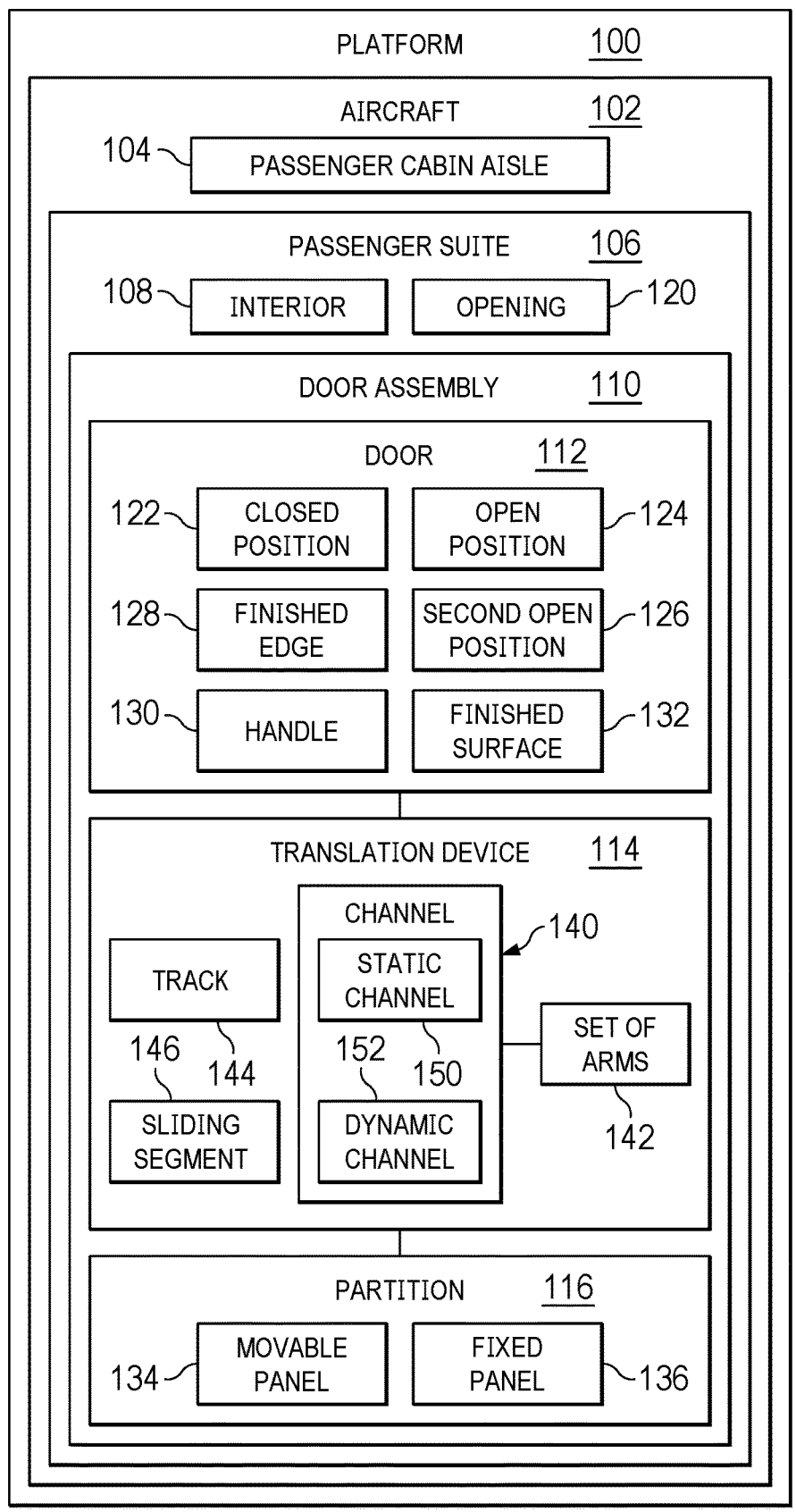
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative example. Platform 100 has aircraft 102 in this illustrative example.

The illustration of aircraft 102 in FIG. 1 is not meant to imply physical or architectural limitations to the manner in which an illustrative example may be implemented. For example, although aircraft 102 may be a commercial aircraft, aircraft 102 may be a military aircraft, a rotorcraft, a helicopter, an unmanned aerial vehicle, or any other suitable aircraft that includes a door assembly.

Although the illustrative examples are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where a door assembly is desirable.

In this illustrative example, platform 100 takes the form of aircraft 102. In this illustrative example, when platform 100 takes the form of aircraft 102, aircraft 102 includes passenger cabin aisle 104 and passenger suite 106. Passenger cabin aisle 104 typically runs longitudinal along the length of aircraft 102 and leads to at least one passenger suite 106.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

Passenger suite 106 includes interior 108, door assembly 110, and opening 120. When closed, door assembly 110 separates interior 108 of passenger suite 106 from passenger cabin aisle 104. When open, door assembly 110 creates opening 120 as a passageway between passenger cabin aisle 104 and interior 108 of passenger suite 106. Interior 108, for example, typically includes a seat, an armrest, a display, a tray table, etc. The illustrative examples are not meant to limit the contents of interior 108 or what interior 108 may include.

Door assembly 110 includes door 112, translation device 114, and partition 116. Door 112 is movable relative to partition 116 to create opening 120 or to close off interior 108 from passenger cabin aisle 104.

In this illustrative example, door 112 is movable relative to partition 116 between closed position 122, open position 124, and second open position 126. Door 112 includes finished edge 128. Finished edge 128 may also be considered a front edge of door 112. Finished edge 128 has been manufactured to be aesthetic or decorative, as opposed to a raw, unfinished edge. Door 112 includes handle 130. Handle 130 provides a surface for an operator of door 112 to impart a force on door 112 in order to open or close door 112 relative to partition 116. Handle 130 may be accessible to an operator of door 112 from interior 108 or passenger cabin aisle 104.

Door 112 includes finished surface 132. Finished surface 132 is a generally vertical side of door 112 that faces passenger cabin aisle 104. For example, finished surface 132 may be decorative or may be finished in an attempt to obscure or camouflage door 112 from passengers passing by passenger suite 106 as they travel down passenger cabin aisle 104.

When door 112 is in open position 124, finished edge 128 is spaced a first distance from another door assembly. When door 112 is in second open position 126, finished edge 128 is spaced a second distance from the another door assembly such that the second distance is greater than the first distance.

Closed position 122 positions door 112 relative to partition 116 such that interior 108 of passenger suite 106 is closed off from, separated from passenger cabin aisle 104.

Open position 124 positions door 112 to create opening 120. In open position 124, opening 120 is the standard regulatory size for passenger suites on aircraft. However, in second open position 126, opening 120 is larger than standard. Second open position 126 provides larger than standard opening 120 that enables improved access for passengers with restricted mobility.

Door 112 connected to partition 116 separates interior 108 from passenger cabin aisle 104. Partition 116 includes movable panel 134 connected to fixed panel 136.

Door 112 is slidably connected to movable panel 134 by translation device 114. When moving door 112 between closed position 122 and open position 124, door 112 is slidable relative to movable panel 134 and fixed panel 136 such that a plane of door 112 or a plane of finished surface 132 remains parallel with a plane of movable panel 134 and a plane of fixed panel 136 or a plane of partition 116 as a whole. When door 112 is in closed position 122 or in open position 124, movable panel 134 is co-planar with fixed panel 136.

Movable panel 134 is pivotally connected to fixed panel 136 by translation device 114. Door 112 and movable panel 134 pivotally move together relative to fixed panel 136. When moving door 112 and movable panel 134 together relative to fixed panel 136 between open position 124 and second open position 126, door 112 and movable panel 134 together are pivotable relative to fixed panel 136 such that a plane of door 112 and a plane of fixed panel 136 remain parallel. Door 112 overlaps partition 116 when door 112 is in closed position 122, open position 124, and second open position 126.

If for any reason, a mechanical failure results in door 112 being unable to slidably move with respect to movable panel 134 of partition 116 to make opening 120, the pivotal connection of door 112 to movable panel 134 of partition 116 allows door assembly to create opening 120 in a secondary fashion. This secondary opening feature, which is accessible from both interior 108 and passenger cabin aisle 104, allows door assembly 110 to satisfy the functional emergency passage feature required by regulators for suites that include doors.

Translation device 114 includes channel 140, set of arms 142, track 144, and sliding segment 146.

As used herein, a "set of," when used with reference to items, means one or more items. For example, a "set of arms 142" is one or more arms.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Translation device 114 pivotally connects movable panel 134 to fixed panel 136 with set of arms 142 and channel 140.

Channel 140 includes static channel 150 formed in fixed panel 136. Static channel 150 is recessed within the thickness of fixed panel 136. In other words, edges of static channel 150 do not extend past a face of fixed panel 136.

Channel 140 includes dynamic channel 152 formed in movable panel 134. Dynamic channel 152 is recessed within the thickness of movable panel 134. In other words, edges of dynamic channel 152 do not extend past a face of movable panel 134. In closed position 122 and open position 124, dynamic channel 152 is positioned end-to-end with static channel 150. In other words, in closed position 122 and open position 124, dynamic channel 152 is linearly aligned with static channel 150.

Channel 140 is sized to accept set of arms 142 within. In closed position 122 and open position 124, set of arms 142 are nested within channel 140. A depth of channel 140 is sufficient to completely envelope set of arms 142. In other words, set of arms 142 fit within channel 140 such that no part of set of arms 142 extend past a mouth of channel 140.

Translation device 114 slidably connects movable panel 134 to door 112 with sliding segment 146 and track 144.

Track 144 is connected to door 112. Sliding segment 146 is connected to movable panel 134. Track 144 is connected to door 112 on an opposite side of door 112 from finished surface 132. Alternatively, sliding segment 146 may be connected to door 112 and track 144 may be connected to movable panel 134. In either scenario, door 112 is slidably connected to movable panel 134 as sliding segment 146 engages track 144. Track 144 provides a slidable engagement with sliding segment 146.

Figure 2:
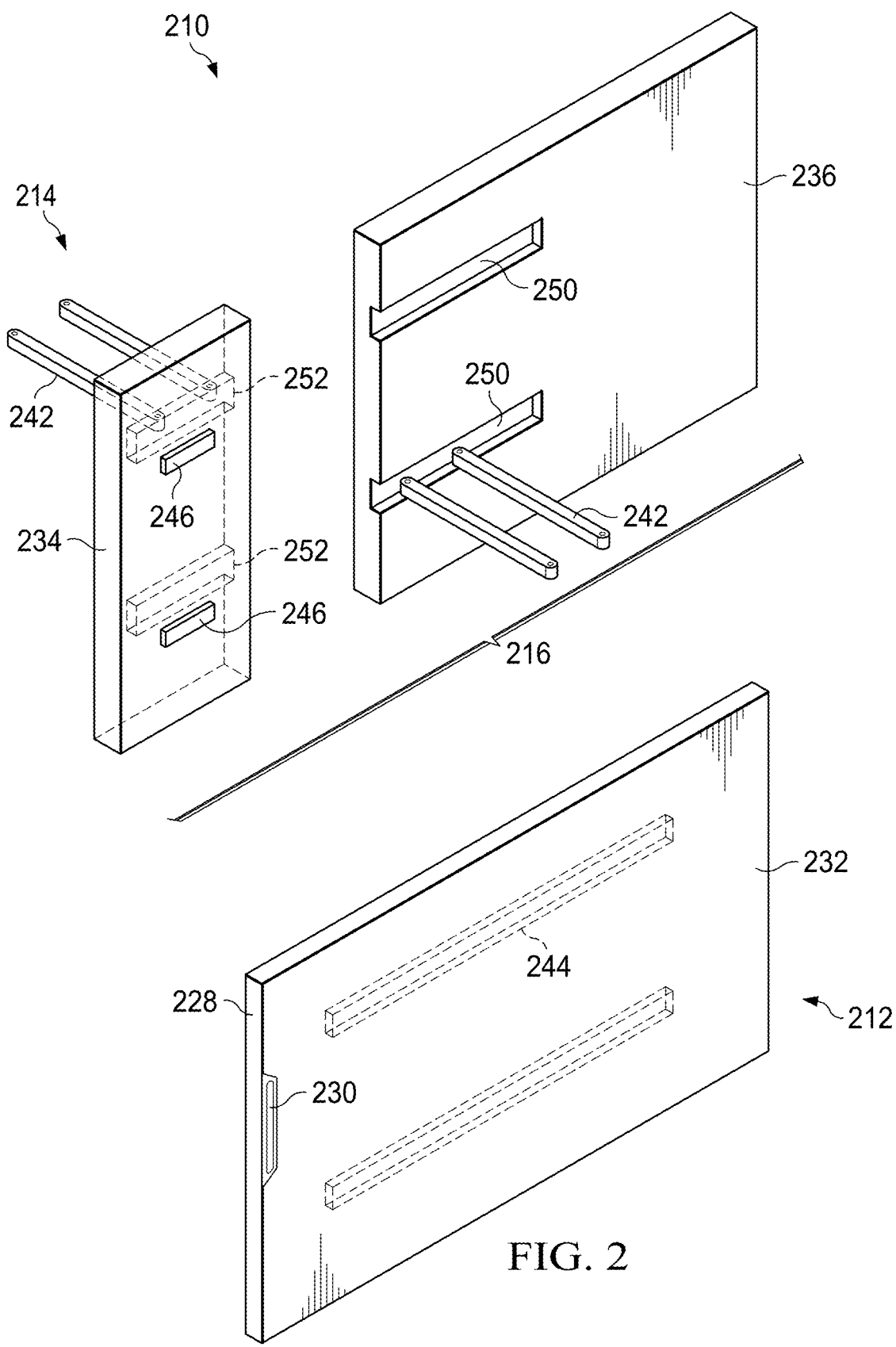
FIG. 2 is an illustration of an exploded view of a door assembly in accordance with an illustrative embodiment.

With reference next to FIG. 2, an illustration of an exploded view of a door assembly is depicted in accordance with an illustrative embodiment. In this illustrative example and the illustrative examples that follow, the same reference numeral may be used in more than one figure. This reuse of a reference numeral in different figures represents the same element in the different figures. The components illustrated in FIG. 2 are examples of physical implementations of door assembly 110 shown in block form in FIG. 1.

As illustrated, door assembly 210 includes door 212, translation device 214, and partition 216. Door 212 includes finished edge 228, handle 230, and finished surface 232. Finished edge 228 may also be considered a front edge of door 212. Finished edge 228 has been manufactured to be visually appealing and not raw or unfinished. Handle 230 provides a touchpoint for an operator of door 212 to impart a force on door 212 in order to open or close door 212 relative to partition 216. Finished surface 232 is a vertical face of door 212 that faces the passenger cabin aisle. Finished surface 232 may be decorative. Translation device 214 includes static channel 250, dynamic channel 252, set of arms 242, track 244, and sliding segment 246.

Partition 216 includes movable panel 234 connected to fixed panel 236. Movable panel 234 is pivotally connected to fixed panel 236 with set of arms 242. Set of arms 242 is pivotally connected to movable panel 234 in dynamic channel 252. Set of arms 242 is pivotally connected to fixed panel 236 in static channel 250. The opening of dynamic channel 252 faces an opposite direction of an opening of static channel 250.

Track 244 is connected to door 212. Track 244 is connected to door 212 on an opposite surface of door 212 from finished surface 232. Sliding segment 246 is connected to movable panel 234. In an alternate arrangement, not shown, sliding segment 246 may be connected to door 212 and track 244 may be connected to movable panel 234. In either scenario, door 212 is slidably connected to movable panel 234 as sliding segment 246 engages track 244.

Figure 3:
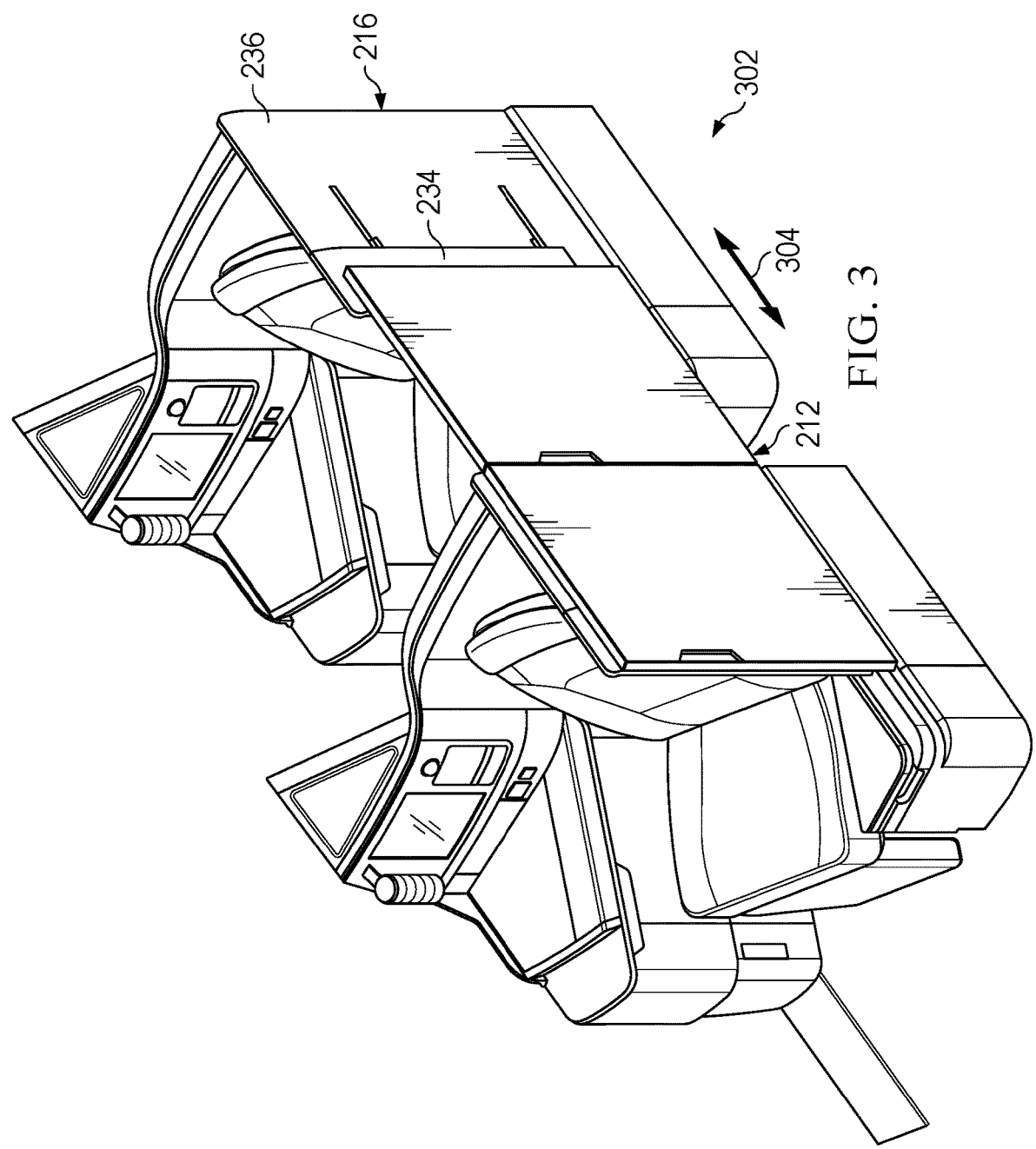
FIG. 3 is an illustration of a door assembly in a closed position in accordance with an illustrative embodiment.

With reference to FIG. 3, an illustration of a door assembly in a closed position is depicted in accordance with an illustrative example.

Door 212 is in closed position 302. Door 212 slidably moves in direction 304 relative to partition 216. Door 212 slidably moves in direction 304 relative to both fixed panel 236 and movable panel 234. Door 212 slidably moves in direction 304 relative to partition 216 via a sliding segment engaged with a track (not shown) as previously described.

Figure 4:
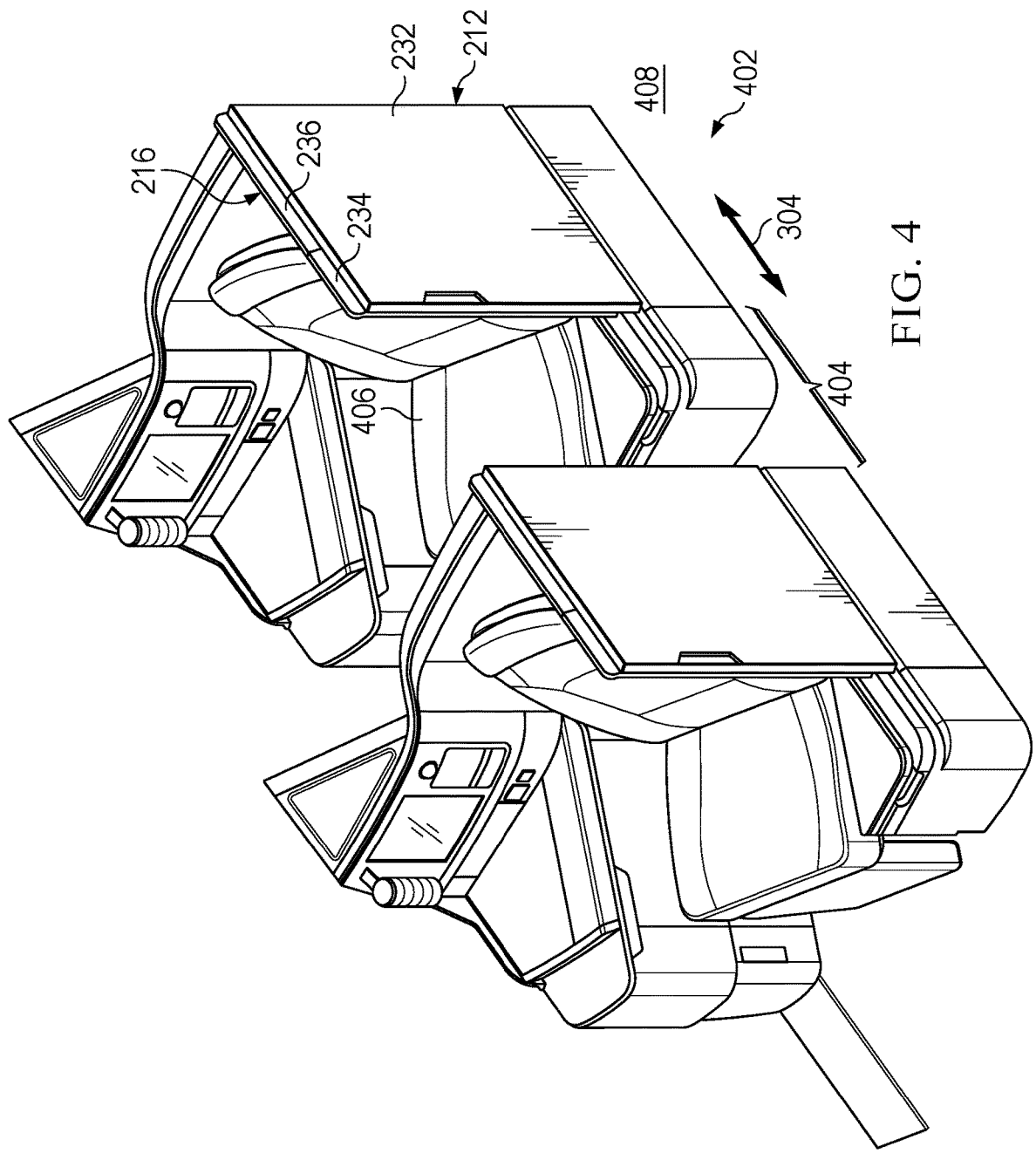
FIG. 4 is an illustration of a door assembly in an open position in accordance with an illustrative embodiment.

With reference to FIG. 4, an illustration of a door assembly in an open position is depicted in accordance with an illustrative example.

Door 212 is in open position 402. Door 212 slidably moves in direction 304 relative to partition 216. Door 212 slidably moves in direction 304 relative to both fixed panel 236 and movable panel 234. Door 212 slidably moves in direction 304 relative to partition 216 via a sliding segment engaged with a track (not shown) as previously described.

When moving door 212 between closed position 302 and open position 402, door 212 is slidable relative to movable panel 234 and fixed panel 236 such that a plane of door 212 or a plane of finished surface 232 remains parallel with a plane of movable panel 234 and a plane of fixed panel 236 or a plane of partition 216 as a whole. When door 212 is in open position 402, opening 404 is present. Opening 404 allows ingress and egress between interior 406 and passenger cabin aisle 408. In other words, opening 404 is the distance between door 212 and another door assembly of another passenger suite when door 212 is in open position 402. When door 212 is in closed position 302 or in open position 402, movable panel 234 is co-planar with fixed panel 236.

Figure 5:
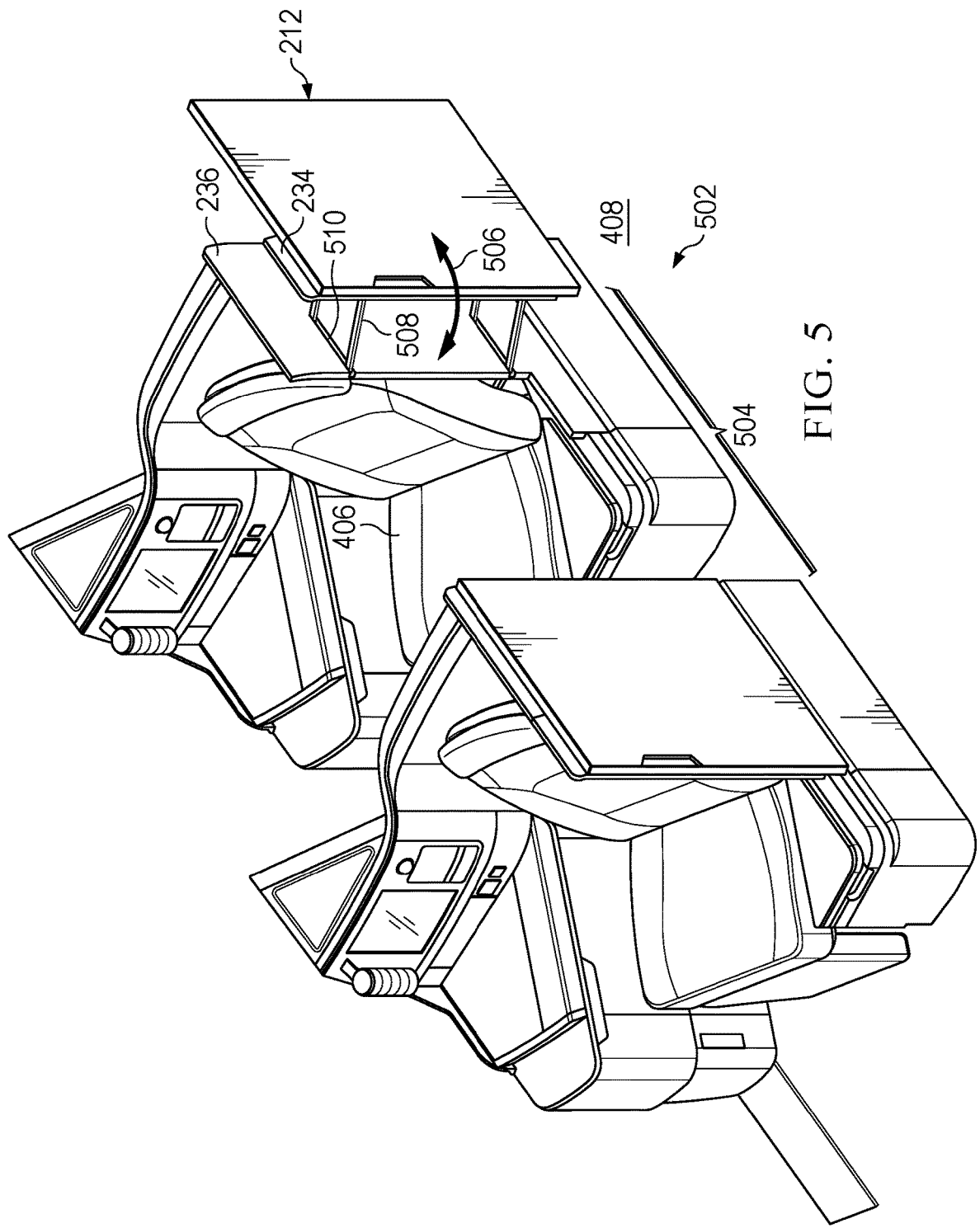
FIG. 5 is an illustration of a door assembly in a second open position in accordance with an illustrative embodiment.
Figure 6:
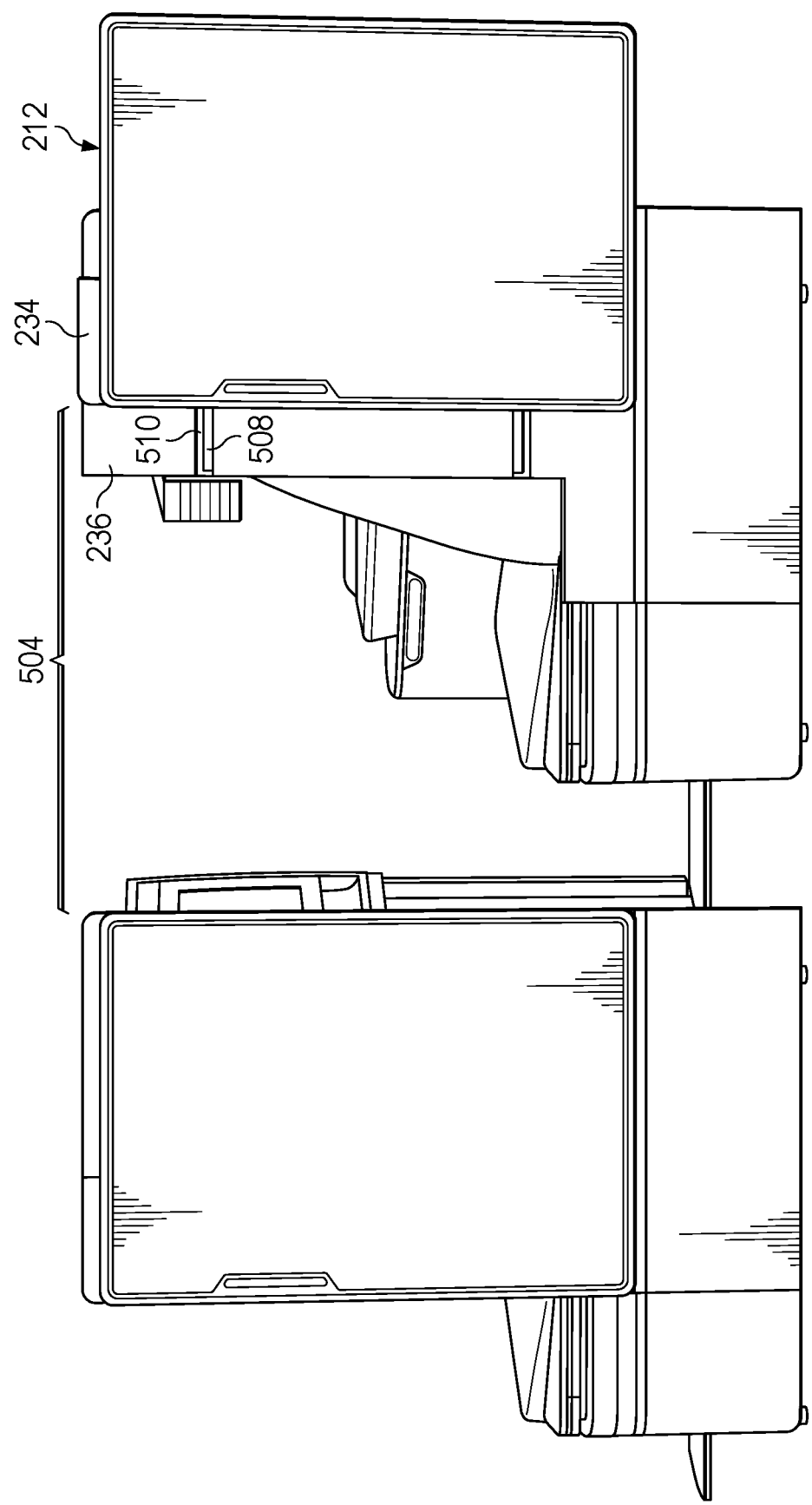
FIG. 6 is an illustration of a door assembly in a second open position in accordance with an illustrative embodiment.

With reference to FIGS. 5-6, illustrations of a door assembly in a second open position are depicted in accordance with an illustrative example. This second open position can be considered an improved access open position.

Movable panel 234 is pivotally connected to fixed panel 236 with set of arms 508. Set of arms 508 is pivotally connected to movable panel 234 (not shown). Set of arms 508 is pivotally connected to fixed panel 236 in static channel 510.

Door 212 is in second open position 502. Door 212 and movable panel 234 move together relative to fixed panel 236. Door 212 and movable panel 234 pivot or swing together in direction 506 between open position 402 of FIG. 4 and second open position 502 of FIGS. 5-6.

When moving door 212 and movable panel 234 together relative to fixed panel 236 between open position 402 and second open position 502, door 212 and movable panel 234 together are pivotable relative to fixed panel 236 such that a plane of door 212 and a plane of fixed panel 236 remain parallel.

When door 212 is in second open position 502, opening 504 is present. Opening 504 allows greater access for ingress and egress of restricted mobility passengers between interior 406 and passenger cabin aisle 408 than does open position 402. In other words, opening 504 is the distance between door 212 and another door assembly of another passenger suite when door 212 is in second open position 502. In other words, opening 404 is a first distance and opening 504 is a second distance where the second distance of opening 504 is greater than the first distance of opening 404. Door 212 overlaps partition 216 when door 212 is in closed position 302, open position 402, and second open position 502.

Figure 7:
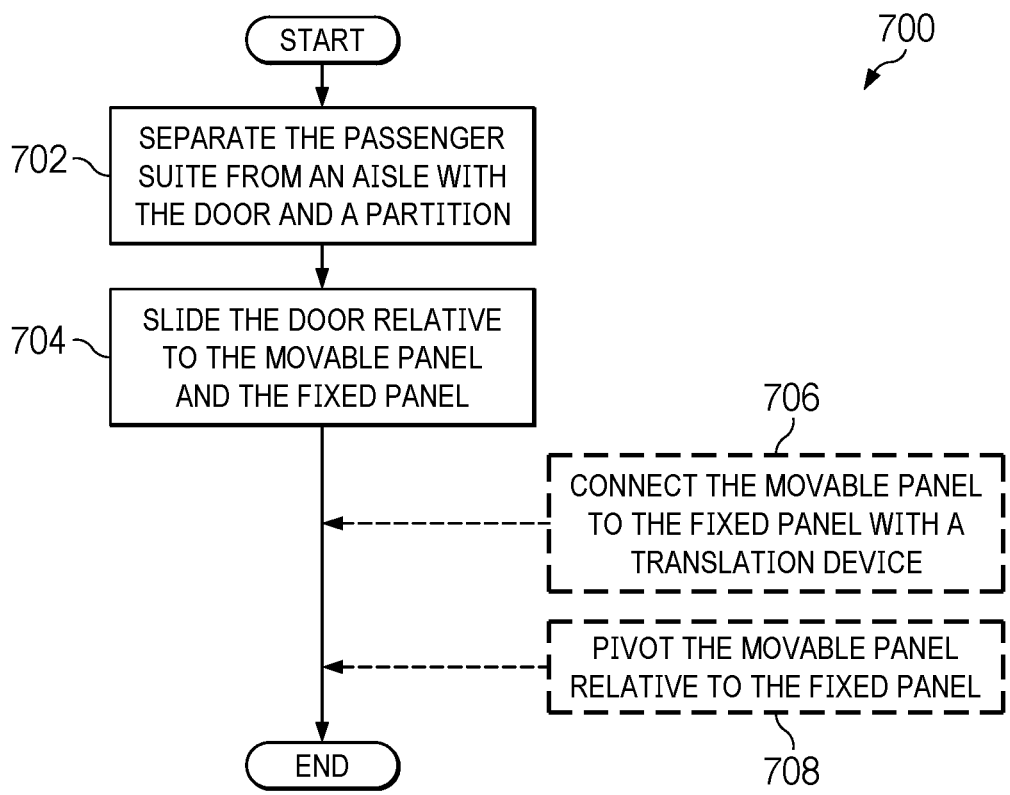
FIG. 7 is an illustration of a flowchart of a process for opening a door of a passenger suite in accordance with an illustrative embodiment.

With reference next to FIG. 7, an illustration of a flowchart of a process 700 for opening a door of a passenger suite is depicted in accordance with an illustrative example. The method depicted in FIG. 7 may be used in conjunction with the door assembly depicted in FIGS. 1-6.

The process begins by separating the passenger suite from an aisle with the door and a partition (operation 702). The partition includes a movable panel and a fixed panel. The door is connected to the movable panel. The process continues by sliding the door relative to the movable panel and the fixed panel (operation 704). The door slides relative to the movable panel and the fixed panel from a closed position to a first open position. A plane of the door and a plane of the partition remain parallel. At operation 706, the process connects the movable panel to the fixed panel with a translation device. The translation device provides a pivotable connection between the movable panel and the fixed panel of the partition. At operation 708, the process pivots the door and the movable panel relative to the fixed panel via the translation device. The door and the movable panel move from the first open position to a second open position. A plane of the door and a plane of the fixed panel remain parallel.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
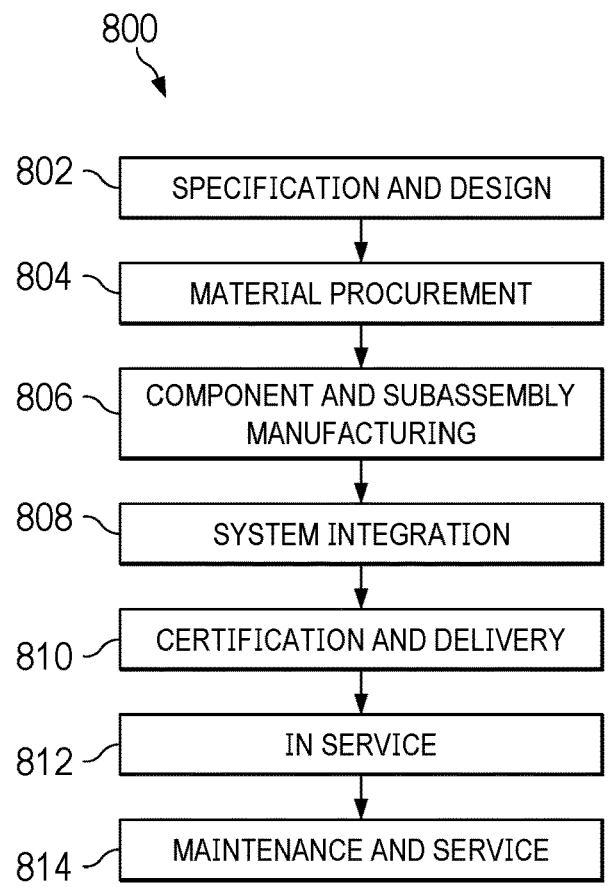
FIG. 8 is an illustration of a block diagram of an aircraft manufacturing and service method in accordance with an illustrative embodiment.
Figure 9:
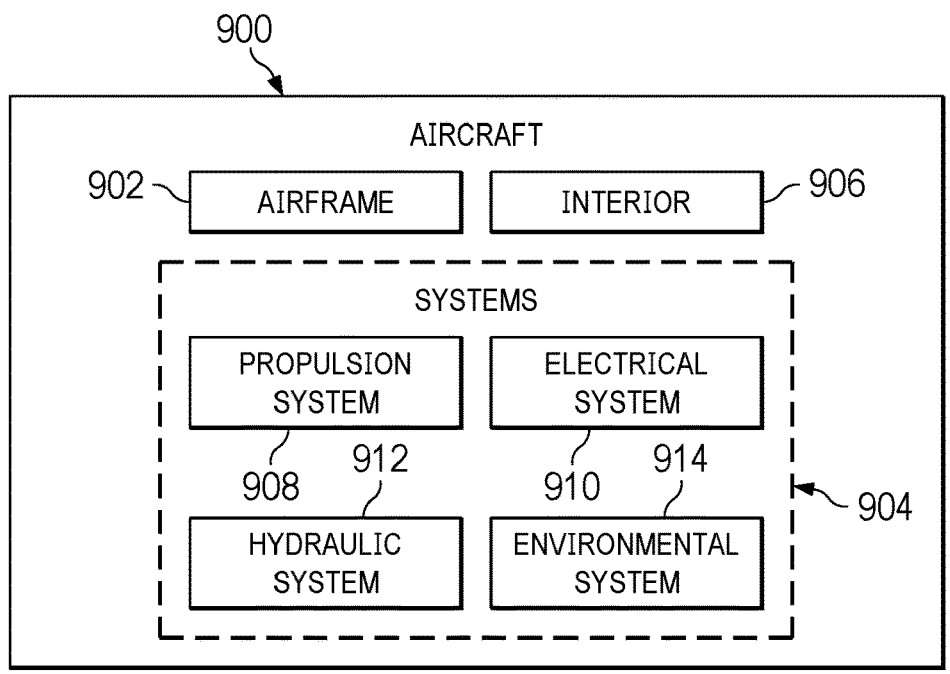
FIG. 9 is an illustration of a block diagram of an aircraft in which an illustrative embodiment may be implemented.

The illustrative embodiments of the disclosure may be further described in the context of aircraft manufacturing and service method 800 as shown in FIG. 8 and aircraft 900 as shown in FIG. 9. Turning first to FIG. 8, an illustration of a block diagram of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance, service, or inspection.

The apparatus of this disclosure may be installed on an aircraft during component and subassembly manufacturing 806. In addition, the apparatus of this disclosure may be retrofitted onto aircraft 900 in FIG. 9 during routine maintenance and service 814 as part of a modification, reconfiguration, or refurbishment of aircraft 900 in FIG. 9.

Each of the processes of aircraft manufacturing and service method 800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 9, an illustration of a block diagram of an aircraft is depicted in which an illustrative embodiment may be implemented. In this example, aircraft 900 is produced by aircraft manufacturing and service method 900 in FIG. 9 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8. In one illustrative example, components or subassemblies produced in component and subassembly manufacturing 806 in FIG. 8 may be fabricated or manufactured in a manner similar to components or subassemblies produced while aircraft 900 is in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 is in service 812, during maintenance and service 814 in FIG. 8, or both. The use of a number of the different illustrative embodiments may substantially expedite the assembly of aircraft 900, reduce the cost of aircraft 900, or both expedite the assembly of aircraft 900 and reduce the cost of aircraft 900.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A door assembly for a passenger suite of an aircraft, comprising:
   a door movable between a closed position, a first open position, and a second open position;
   a translation device connected to the door; and
   a partition comprising a fixed panel and a movable panel, the movable panel pivotally connected to the fixed panel with the translation device;
   wherein the door is slidable relative to the partition between the closed position and the first open position via the translation device and wherein the door is pivotable relative to the partition between the first open position and the second open position via the translation device, wherein when the door is in the closed position and in the first open position, the movable panel is co-planar with the fixed panel.

2. The door assembly of claim 1, wherein the translation device comprises:
   a channel formed in the partition;
   a track connected to the door;
   a set of arms pivotally connected to the partition in the channel; and
   a sliding segment connected to the partition opposite the pivotal connection, the sliding segment slidable along the track.

3. The door assembly of claim 2, wherein the channel is sized to accept the set of arms within the channel when the door is in the closed position or the first open position.

4. The door assembly of claim 2, wherein the movable panel is slidably connected to the door by the sliding segment engaged with the track.

5. The door assembly of claim 1, wherein the door comprises a finished edge, a finished surface, and a handle, the handle accessible from inside and outside of the passenger suite.

6. The door assembly of claim 1, wherein when the door is in the first open position, a front edge of the door is spaced a first distance from another door assembly, and wherein when the door is in the second open position, the front edge of the door is spaced a second distance from the another door assembly, wherein the second distance is greater than the first distance.

7. The door assembly of claim 1, wherein a plane of the partition remains parallel with a plane of the door as the door translates from the closed position to the first open position to the second open position.

8. The door assembly of claim 1, wherein the door assembly separates the passenger suite from a passenger cabin aisle, and wherein operation of the door assembly can be accomplished from within the passenger suite and from the passenger cabin aisle.

9. The door assembly of claim 1, wherein the door overlaps an exterior surface of the partition when the door is in the closed position and the first open position and the second open position.

10. The door assembly of claim 1, wherein the translation device further comprises:
    a dynamic channel formed in the movable panel;
    a static channel formed in the fixed panel;
    a track connected to the door;
    a set of arms pivotally connected to the movable panel in the dynamic channel and pivotally connected to the fixed panel in the static channel; and
    a sliding segment connected to the movable panel, the sliding segment engaged with the track and slidable along the track.

11. The door assembly of claim 10, wherein an opening of the dynamic channel faces an opposite direction of an opening of the static channel.

12. A passenger suite for an aircraft, comprising:
    a partition comprising a fixed panel and a movable panel, the movable panel pivotally connected to the fixed panel with a translation device; and
    a door slidably connected to the movable panel, the door and the partition separating the passenger suite from a passenger cabin aisle of the aircraft;
    wherein the door is movable between a closed position, a first open position, and a second open position relative to the partition via the translation device, wherein when the door is in the closed position and in the first open position, the movable panel is co-planar with the fixed panel.

13. The passenger suite of claim 12 wherein the translation device comprises:
    a dynamic channel formed in the movable panel, the dynamic channel open to an interior of the passenger suite;
    a static channel formed in the fixed panel, the static channel open to the passenger cabin aisle; and
    a set of arms pivotally connected to the movable panel in the dynamic channel and pivotally connected to the fixed panel in the static channel.

14. The passenger suite of claim 13, wherein the dynamic channel and the static channel are sized and shaped to accept the set of arms within.

15. The passenger suite of claim 12 wherein the translation device comprises:
    a set of arms pivotally connecting the movable panel and the door to the fixed panel;
    a track connected to the door; and
    a sliding segment connected to the movable panel, the sliding segment slidable along the track.

16. The passenger suite of claim 15, wherein the sliding segment and the set of arms are connected to opposite sides of the movable panel.

17. The passenger suite of claim 12, wherein the door comprises a handle, the handle accessible from inside the passenger suite and from the passenger cabin aisle.

18. A method for opening a door of a passenger suite, comprising:
    separating the passenger suite from an aisle with the door and a partition, the partition comprising a movable panel pivotally connected to a fixed panel with a translation device, wherein the door is slidably connected to the movable panel with the translation device; and sliding the door relative to the movable panel and the fixed panel from a closed position to a first open position such that a plane of the door and a plane of the partition remain parallel, wherein when the door is in the closed position and in the first open position, the movable panel is co-planar with the fixed panel.

19. The method of claim 18, further comprising:

pivoting the door and the movable panel relative to the fixed panel via the translation device from the first open position to a second open position such that the plane of the door and a plane of the fixed panel remain parallel.

20. The method of claim 19, wherein when the door is in the first open position, a front edge of the door is spaced a first distance from another door assembly, and wherein when the door is in the second open position, the front edge of the door is spaced a second distance from the another door assembly, wherein the second distance is greater than the first distance.

\* \* \* \* \*